United States Patent [19]

Matsuda et al.

[11] Patent Number: 5,306,075
[45] Date of Patent: Apr. 26, 1994

[54] HYDRAULIC BRAKING PRESSURE CONTROL SYSTEM HAVING AN ON-OFF VALVE RESPONSIVE TO AN OUTPUT HYDRAULIC PRESSURE

[75] Inventors: Shohei Matsuda; Kazutoshi Tashima; Kohichi Furuya; Masaaki Myoi, all of Saitama; Makoto Horiuchi, Nagano, all of Japan

[73] Assignees: Honda Giken Kogyo Kabushiki Kaisha, Tokyo; Nissin Kogyo Co., Ltd., Ueda, both of Japan

[21] Appl. No.: 779,475

[22] Filed: Oct. 18, 1991

[30] Foreign Application Priority Data

Oct. 26, 1990 [JP] Japan .................. 2-289305

[51] Int. Cl.⁵ ............................................. B60T 13/18
[52] U.S. Cl. ..................................... 303/10; 303/116.2
[58] Field of Search ............. 303/115.4, 10, 11, 116.1, 303/116.2

[56] References Cited

U.S. PATENT DOCUMENTS

| | | | |
|---|---|---|---|
| 4,036,534 | 7/1977 | Kondo et al. | 303/115 PP |
| 4,072,366 | 2/1978 | Kondo | 303/115 PP |
| 4,700,991 | 10/1987 | Nishimura et al. | 303/115 PP |
| 4,768,841 | 9/1988 | Watanabe | 303/115 PP X |
| 4,768,843 | 9/1988 | Baughman et al. | 303/115 PP X |
| 4,812,777 | 3/1989 | Shirai | 303/115 PP X |
| 4,890,891 | 1/1990 | Leiber | 303/115 PP |
| 4,893,882 | 1/1990 | Leiber et al. | 303/115 PP |
| 5,039,175 | 8/1991 | Holzmann et al. | 303/116 R X |
| 5,100,211 | 3/1992 | Sugimoto et al. | 303/115 PP |

FOREIGN PATENT DOCUMENTS

| | | |
|---|---|---|
| 0355324 | 2/1990 | European Pat. Off. . |
| 0365769 | 5/1990 | European Pat. Off. . |
| 0388134 | 9/1990 | European Pat. Off. . |
| 0403291 | 12/1990 | European Pat. Off. . |
| 2450874 | 4/1980 | Fed. Rep. of Germany . |
| 3203563 | 8/1983 | Fed. Rep. of Germany ...... 303/115 PP |
| 449 | 1/1983 | Japan .................. 303/115 PP |
| 181749 | 8/1986 | Japan .................. 303/115 PP |
| 77267 | 4/1987 | Japan .................. 303/116 R |
| 311945 | 12/1989 | Japan .................. 303/115 PP |

Primary Examiner—Robert J. Oberleitner
Assistant Examiner—Alfred Muratori
Attorney, Agent, or Firm—Armstrong, Westerman, Hattori, McLeland & Naughton

[57] ABSTRACT

In a hydraulic braking pressure control system comprising a brake device ($B_{FL}$, $B_{FR}$, $B_{RL}$, $B_{RR}$), hydraulic pressure controller (4) for controlling the hydraulic pressure supply source (2) in accordance with the amount of operation of an operating member (1), an auxiliary hydraulic pressure generator (3) including a working piston (16, 17) operatively connected to the operating member to advance in response to operation of the operating member and being slidably received in a housing (14) with a front surface of the working piston facing a hydraulic pressure chamber (18, 19), a hydraulic pressure transmitter (134) comprising a free piston (132) slidably received in a cylinder body (133) and having opposite ends facing an input hydraulic pressure chamber (130) connected to the hydraulic pressure controller and an output hydraulic pressure chamber (131) leading to the brake device, respectively, and an on-off valve (135) interposed between the hydraulic pressure chamber (18, 19) in the auxiliary hydraulic pressure generator (3) and the brake device and adapted to be closed in response to an increase in output hydraulic pressure from the hydraulic pressure controller, there is further included valve-opening device (136) for forcedly opening the on-off valve in response to the movement of the free piston by a predetermined distance or more in a direction to reduce the volume of the output hydraulic pressure chamber. This ensures that when an abnormality such as wear of a pad or a vapor lock is produced on the side of the brake device in a condition in which the hydraulic pressure supply source is normal, a deficiency of hydraulic pressure can be compensated for, and when a leak of fluid is produced, this can be detected promptly.

9 Claims, 2 Drawing Sheets

HYDRAULIC BRAKING PRESSURE CONTROL SYSTEM HAVING AN ON-OFF VALVE RESPONSIVE TO AN OUTPUT HYDRAULIC PRESSURE

BACKGROUND OF THE INVENTION

1. Field of the Invention

This invention relates to a hydraulic braking pressure control system comprising a brake device; a hydraulic pressure control means for controlling the hydraulic pressure from a hydraulic pressure supply source in accordance with the amount of operation of an operating member; an auxiliary hydraulic pressure generating means including a working piston operatively connected to the operating member to advance in response to operation of the operating member and being slidably received in a housing with a front surface of the working piston facing a hydraulic pressure chamber; a hydraulic pressure transmitting means comprising a free piston slidably received in a cylinder body and having opposite ends facing an input hydraulic pressure chamber connected to the hydraulic pressure control means and an output hydraulic pressure chamber leading to the brake device, respectively; and an on-off valve interposed between the hydraulic pressure chamber in the auxiliary hydraulic pressure generating means and the brake device and adapted to be closed in response to an increase in output hydraulic pressure from the hydraulic pressure control means.

2. Description of the Relevant Art

Such a hydraulic braking pressure control system is known, for example, from Japanese Patent Publication No. 53263/86.

In this prior art hydraulic braking pressure control system, a hydraulic pressure controlled in the supply source hydraulic pressure control means is applied to the brake device via the hydraulic pressure transmitting means, and if the hydraulic pressure supply source fails for any reason, with the result that a satisfactory hydraulic pressure from the supply source cannot be ensured, a hydraulic pressure from the auxiliary hydraulic pressure generating means is applied to the brake device by opening the on-off valve.

However, if uneven wear of a pad occurs in the brake device, or if a vapor lock is produced in a hydraulic circuit between the hydraulic pressure transmitting means and the brake device, for example, the amount of fluid consumed is abnormally increased, with the result that a satisfactory hydraulic braking pressure may not be obtained in some cases, even if the hydraulic pressure supply source is in its normal state. In such a case, if a deficiency can be supplied from the auxiliary hydraulic pressure generating means, a satisfactory hydraulic braking pressure can be ensured. In addition, if a leak of fluid occurs on the brake device side in a condition in which the hydraulic pressure supply source is in its normal state, a satisfactory hydraulic braking pressure cannot be provided. Therefore, it is desirable that such a leak of fluid can be promptly detected.

SUMMARY OF THE INVENTION

According to the present invention, there is provided a hydraulic braking pressure control system as set forth above, wherein the system further includes a valve-opening means for forcedly opening the on-off valve in response to the movement of the free piston by a predetermined distance or more in a direction to reduce the volume of the output hydraulic pressure chamber.

With such a provision, if an abnormality occurs on the brake device side which results in an increased amount of fluid being consumed during normal braking and when the hydraulic pressure from the hydraulic pressure source is normal, the amount of movement of the free piston toward the output hydraulic pressure chamber is abnormally increased. This causes the valve-opening means to forcedly open the on-off valve, thereby permitting a hydraulic pressure to be applied from the auxiliary hydraulic pressure generating means to the brake device. Therefore, when the amount of fluid consumed is increased on the brake device side, due to uneven wear of a brake pad or a vapor lock for example, a deficiency can be compensated for by the auxiliary hydraulic pressure generating means. In addition, if a leak of fluid occurs on the brake device side, the stroke of the working piston in the auxiliary hydraulic pressure generating means, i.e. the operation stroke of the operating member, is increased as compared with a normal condition. This enables an operator to promptly recognise the fact that an abnormality has occurred.

An embodiment of the invention will now be described by way of example and with reference to the accompanying drawings.

DESCRIPTION OF THE PREFERRED EMBODIMENTS

The embodiment to be described is a hydraulic braking pressure control system for a front engine and front wheel drive vehicle.

Figure 1:
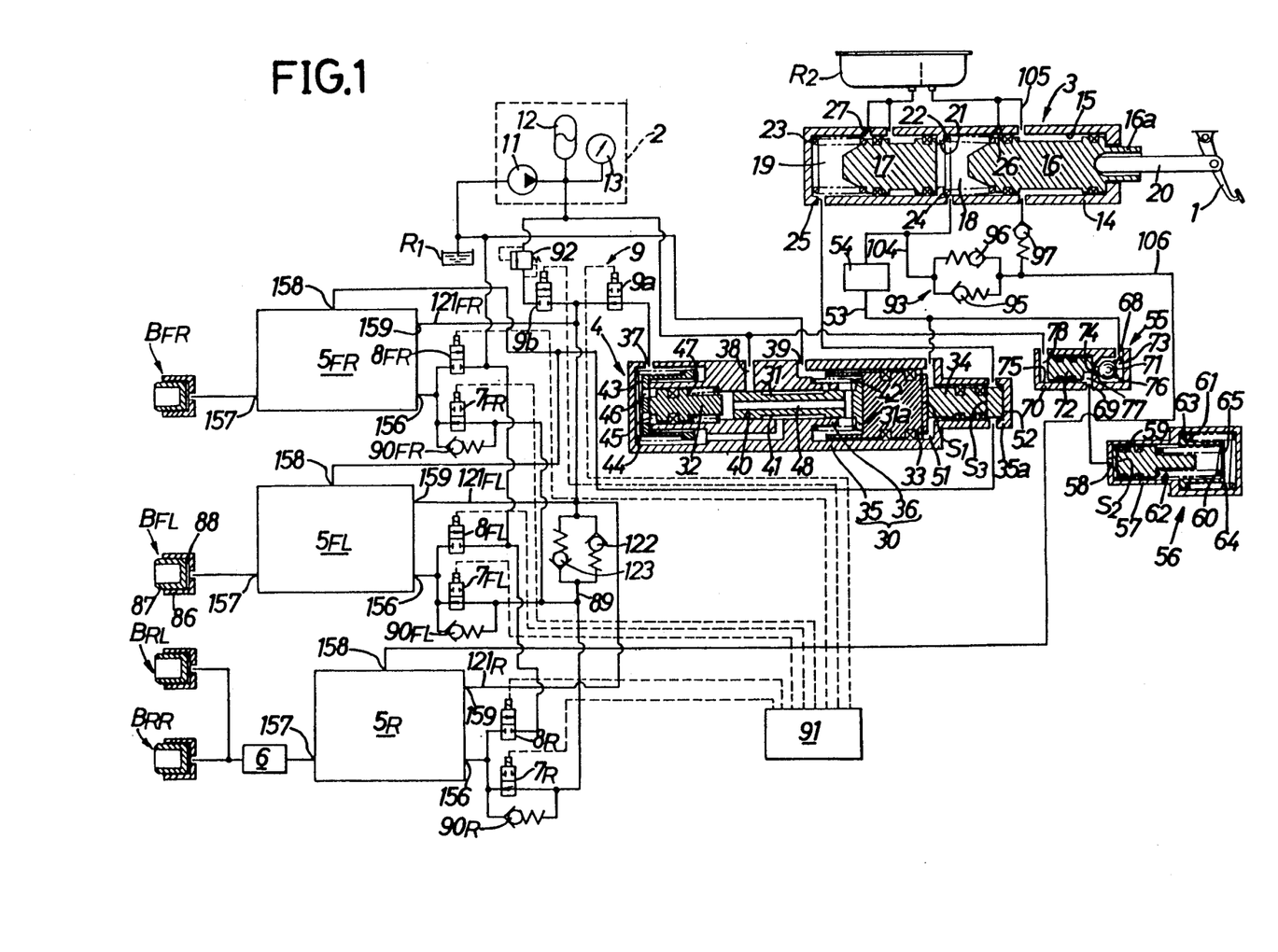
FIG. 1 is a diagram of a hydraulic circuit.

Referring first to FIG. 1, a left front wheel brake device $B_{FL}$ and a right front wheel brake device $B_{FR}$ are mounted on left and right front wheels of a vehicle, respectively, while a left rear wheel brake device $B_{RL}$ and a right rear wheel brake device $B_{RR}$ are mounted on left and right rear wheels. An auxiliary hydraulic pressure generating means 3 is connected to a brake pedal 1 as a braking member for producing a hydraulic pressure corresponding to an amount of brake pedal depression, so that a hydraulic pressure from a hydraulic pressure supply source 2 is controlled by a supply source hydraulic pressure control means 4 in accordance with a hydraulic pressure produced by the auxiliary hydraulic pressure generating means 3, i.e. with the amount of brake pedal depression. During normal braking, a hydraulic braking pressure corresponding to an output hydraulic pressure from the supply source hydraulic pressure-control means 4 is applied to each of the front wheel brake devices $B_{FL}$ and $B_{FR}$ through respective hydraulic pressure switchover devices $5_{FL}$ and $5_{FR}$ and to each of the rear wheel brake devices $B_{RL}$ and $B_{RR}$ through a hydraulic pressure switchover device $5_R$ and a proportional pressure-reducing valve 6. During braking in the event that the hydraulic pressure supply source 2 has failed, a hydraulic pressure generated in the auxiliary hydraulic pressure generating means 3 is applied to the brake devices $B_{FL}$, $B_{FR}$, $B_{RL}$ and $B_{RR}$ via the hydraulic pressure switchover devices $5_{FL}$, $5_{FR}$ and $5_R$. Further, the hydraulic braking pressures in the brake devices $B_{FL}$, $B_{FR}$, $B_{RL}$ and $B_{RR}$ can be maintained or reduced by operation of inlet solenoid valves $7_{FL}$ and $7_{FR}$ and outlet solenoid valves $8_{FL}$ and $8_{FR}$ provided independently in correspondence to the front wheel brake devices $B_{FL}$ and $B_{FR}$, as well as an inlet solenoid valve $7_R$ and an outlet solenoid valve $8_R$ provided in common with the rear wheel brakes $B_{RL}$ and $B_{RR}$, to effect an anti-lock control, and the hydraulic braking pressures in the brake devices $B_{FL}$ and $B_{FR}$ can be increased by operation of a traction-controlling switchover control valve means 9 to effect a traction control.

The hydraulic pressure supply source 2 comprises a hydraulic pump 11 for pumping a working or hydraulic fluid from a reservoir $R_1$, an accumulator 12 connected to the hydraulic pump 11, and a pressure switch 13 for controlling the operation of the hydraulic pump 11.

The auxiliary hydraulic pressure generating means 3 comprises a first housing 14 formed in a cylindrical configuration with opposite ends closed. Slidably received in a first cylinder bore 15 provided in the housing 14 are a first working piston 16 and a second working piston 17 disposed forwardly of, and spaced from, the first working piston 16. A first hydraulic pressure chamber 18 is defined between the first and second working pistons 16 and 17, and a second hydraulic pressure chamber 19 is defined between a front end wall of the first cylinder bore 15 and the second working piston 17.

The first working piston 16 is integrally provided with a piston rod 16a projecting outwardly and extending liquid-tightly and movably through a rear end wall of the first cylinder bore 15, and a front end of an urging rod 20 connected to the brake pedal 1 abuts against the piston rod 16a. Thus, the first working piston 16 can be advanced within the first cylinder bore 15 in response to operation of the brake pedal 1.

A stopper 21 is provided on an inner surface of the first cylinder bore 15 to project radially inwardly and is adapted to abut against the rear end of the second working piston 17 to provide a retreat limit for the piston 17. A first return spring 22 is mounted in a compressed manner between the stopper 21 and the first working piston 16 for biasing the piston 16 rearwardly. A second return spring 23 is also mounted in a compressed manner between the front end wall of the first cylinder bore 15 and the second working piston 17 for biasing the piston 17 rearwardly. This ensures that the second working piston 17 is advanced by generation of a hydraulic pressure in the first hydraulic pressure chamber 18 in response to the advancing movement of the first working piston 16. However, the second return spring 23 has a preset load set at such a value that the second working piston 17 is advanced only after an on-off valve 135 (which will be described hereinafter) in each of the hydraulic pressure switchover devices $5_{FL}$, $5_{FR}$ and $5_R$ has been closed by a hydraulic pressure from the supply source hydraulic pressure control means 4 operated in accordance with the hydraulic pressure in the first hydraulic pressure chamber 18.

The first housing 14 is provided with a first output port 24 leading from the first hydraulic pressure chamber 18, a second output port 25 leading from the second hydraulic pressure chamber 19, and communication ports 26 and 27 permitting the hydraulic pressure chambers 18 and 19 to be put into communication with a reservoir $R_2$, only when the first and second working pistons 16 and 17 have been returned to their retreat limits.

The supply source hydraulic pressure control means 4 comprises a second housing 30, a spool 31 slidably received in the second housing 30, a reaction piston 32, a first urging piston 33 and a second urging piston 34.

The second housing 30 is comprised of an outer cylindrical shell 35 with its opposite ends closed and an inner cylindrical shell 36 coaxially disposed within the outer cylindrical shell 35 and with its opposite ends open, the outer and inner cylindrical shells being secured at their intermediate portions to each other. The outer cylindrical shell 35 includes an output port 37, an input port 38 connected to the hydraulic pressure supply source 2, and a releasing port 39 leading to the reservoir $R_1$, which ports are provided in sequence from the forward to the rearward ends of the shell 35 (from the left to right as viewed in FIG. 1) at spacings from one another. The inner cylindrical shell 36 is provided with a second cylinder bore 40, and the input port 38 opens into an inner surface of the bore 40. Moreover, an annular recess 41 is provided on the outer surface of the spool 31 slidably received in the second cylinder bore 40 and has an axial length such as to permit communication between the output port 37 and the releasing port 39 when the spool 31 is in its rearward position, and to permit a communication between the output port 37 and the input port 38 when the spool 31 is in its forward position.

A collar 31a is provided at a rear end of the spool 31 and projects radially outwardly, and a spring 42 is mounted in a compressed manner between the collar 31a and the housing 30, so that the spool 31 is biased rearwardly by the force of the spring 42.

The reaction piston 32 is slidably received in the second cylinder bore 40 at a location forwardly of the spool 31, for movement into abutment against a front end of the spool 31. A front end of the inner shell 36 is inserted in a cap-like member 43 which is biased rearwardly by the force of a spring 44 mounted in a compressed manner between the member 43 and a front end wall of the outer shell 35. An output pressure application member 45 is defined between the cap-like member 43 and the reaction piston 32 to communicate with the output port 37 through a communication hole 46 provided in the cap-like member 43, with a front surface of the reaction piston 32 facing the output pressure application chamber 45.

A spring 47 is mounted in a compressed manner between the reaction piston 32 and a step provided on an inner surface of the second cylinder bore 40 forwardly of the spool 31, so that the reaction piston 32 is biased forwardly by the force of the spring 47. Moreover, the spring 47 has a preset load set smaller than that of the spring 44, so that in a condition in which no hydraulic pressure is applied to the output pressure application chamber 45, a front end of the reaction piston 32 is in abutment against the cap-like member 43 biased by the spring 44 into abutment against the front end of the inner shell 36.

The spool 31 is provided with a communication passage 48 communicating with the releasing port 39 and opened into a front end face of the spool 31. Therefore, any hydraulic pressure cannot be applied to a back face of the reaction piston 32 and a front face of the spool 31.

The first urging piston 33 is slidably received in the outer shell 35 at a location nearer its rear end and rearwardly of the spool 31, so as to coaxially abut against the rear end of the spool 31. A smaller diameter portion 35a with its rear end closed projects coaxially from the outer shell 35 rearwardly of the first urging piston 33, and the second urging piston 34 is slidably received in the smaller diameter portion 35a to coaxially abut against a rear end of the first urging piston 33. A first input pressure application chamber 51 is defined between the first and second urging pistons 33 and 34, and a second input pressure application chamber 52 is defined between a rear end wall of the smaller diameter portion 35a and the second urging piston 34.

In the supply source hydraulic pressure control means 4, the spool 31 is moved axially by a balance of two hydraulic pressure forces: a rearward hydraulic pressure force applied to the reaction piston 32 by the hydraulic pressure in the output pressure application chamber 45, and a forward hydraulic pressure force applied to the first urging piston 33 or the second urging piston 34 by the hydraulic pressure in the first input pressure application chamber 51 or the second input pressure application chamber 52. The pressure receiving area of the first urging piston 33 facing the first input pressure application chamber 51 is set to be larger than the pressure receiving area of the reaction piston 32 facing the output pressure application chamber 45. This ensures that the spool 31 can be driven axially, even if the hydraulic pressure introduced into the first pressure application chamber 51 is relatively low.

A hydraulic passage 53 leading to the first input pressure application chamber 51 of the supply source hydraulic pressure control means 4 is connected through a proportional pressure-reducing valve 54 to the first output port 24 in the auxiliary hydraulic pressure generating means 3. The proportional pressure-reducing valve 54 serves to proportionally reduce the hydraulic pressure from the first output port 24 when it has more than a certain value, and thereby to apply a reduced hydraulic pressure to the first input pressure application chamber 51, and is of a well-known structure. Further, an accumulator 56 is connected through a shut-off valve 55 to a hydraulic passage 53 between the proportional pressure-reducing valve 54 and the first input pressure application chamber 51.

The accumulator 56 comprises an accumulator body 57, an accumulator piston 59 slidably received in the accumulator body 57 to define therebetween an accumulator chamber 58 connected to the hydraulic passage 53 through the shut-off valve 55, and first and second accumulator springs 60 and 61 interposed in series between the accumulator piston 59 and the accumulator body 57 to bias the accumulator piston 59 in a direction to reduce the volume of the accumulator chamber 58.

The accumulator body 57 is provided with a smaller diameter bore 62 with its one end closed, and a larger diameter bore 64 with one end coaxially connected to the other end of the bore 62 through a step 63 and the other end closed. The accumulator piston 59 is slidably received in the smaller diameter bore 62. The accumulator chamber 58 is defined between one end of the accumulator piston 59 and the closed end of the smaller diameter bore 62. A spring receiving member 65 is axially movably contained in the larger diameter bore 64 for movement into abutment against the step 63, so that the movement thereof toward the one end is restrained. The first accumulator spring 60 is compressed between the accumulator piston 59 and the spring receiving member 65, while the second accumulator spring 61 is compressed between the spring receiving member 65 and the other or closed end of the larger diameter bore 64. Moreover, the preset load of the first accumulator spring 60 is set smaller than the present load of the second accumulator spring 61. Thus, in a condition in which no hydraulic pressure is applied to the accumulator chamber 58, the spring receiving member 65 is in a position in which it abuts against the step 63 under an influence of the second accumulator spring 62.

With the shut-off valve 55 open, hydraulic pressure developed in the first hydraulic pressure chamber 18 by an advancing movement of the first working piston 16 corresponding to a depression of the brake pedal 1, is reduced in the proportional pressure-reducing valve 54 and then accumulated in the accumulator 56 and applied to the first input pressure application chamber 51. The working pressure in the supply source hydraulic pressure control means 4 is set lower than the working pressure in the accumulator 56, so that the operation of the supply source hydraulic pressure control means 4 is started before the accumulator 56 is operated. In other words, the working pressures are set such that the following expression (1) is established, $$f_1/S_1 < f_2/S_2 \tag{1}$$

wherein $S_1$ represents that pressure receiving area of the first urging piston 33 of the supply source hydraulic pressure control means 4 which faces the first input hydraulic pressure chamber 51; $S_2$ represents that pressure receiving area of the accumulator piston 59 which faces the accumulator chamber 58; $f_1$ represents the preset load of the spring 42 in the supply source hydraulic pressure control means 4; and $f_2$ represents the preset load of the first accumulator spring 60 in the accumulator 56.

The shut-off valve 55 is interposed between the accumulator chamber 58 of the accumulator 56 and the hydraulic pressure passage 53 between the proportional pressure-reducing valve 54 and the first input pressure application chamber 51, and is of a construction such that it is closed when the hydraulic pressure in the hydraulic pressure supply source 2 is abnormally reduced. The shut-off valve 55 comprises a shut-off valve body 70 having an inlet port 68 leading to the hydraulic pressure passage 53 and an outlet port 69 leading to the accumulator chamber 58 in the accumulator 56, a valve sphere 71 capable of opening and closing a space between the inlet port 68 and the outlet port 69, and a drive piston 72 for driving the valve sphere 71 for opening and closing the shut-off valve 55, the valve sphere 71 and the drive piston 72 being contained in a shut-off valve body 70.

Provided in the shut-off valve 70 in an axially connected relation are a valve chest 73 leading to the input port 68, a valve bore 74 having an intermediate portion communicating with the outlet port 69, and a slide bore 75 in which the drive piston 72 is slidably received. A tapered valve seat is formed at that end edge of the valve bore 74 which opens into the valve chest 73, and the valve sphere 71, which can seat on the valve seat to close the valve bore 74, is contained in the valve chest 73 for opening and closing movement. Further, a spring 76 is contained in the valve chest 73 to bias the valve sphere 71 in a valve-closing direction.

The drive piston 72 is slidably received in the slide bore 75 with one end face facing an output chamber 77 leading to the valve bore 74 and with the other end face facing a back pressure chamber 78. The drive piston 72 is integrally provided with a smaller diameter drive shank portion which passes smoothly through the valve bore 74 to abut against the valve sphere 71. Moreover, the drive shank portion has an axial length such that the valve sphere 71 can be moved away from the valve seat to open the valve bore 74 in a condition in which the drive piston 72 has been moved in a direction to reduce the volume of the output chamber 77. The hydraulic pressure supply source 2 is connected to the back pressure chamber 78. Thus, in a condition in which the hydraulic pressure supply source 2 is normally operative, the shut-off valve 55 is open, and in response to an abnormal reduction in output hydraulic pressure from the hydraulic pressure supply source 2, the shut-off valve 55 is closed.

Each of the brake devices $B_{FL}$, $B_{FR}$, $B_{RL}$ and $B_{RR}$ comprises a cylinder body 86 and a braking piston 87 slidably received in the cylinder body 86, and creates a braking force by movement of the braking piston 87 in accordance with a hydraulic pressure supplied to a hydraulic braking pressure chamber 88 defined between the cylinder body 86 and the braking piston 87.

Figure 2:
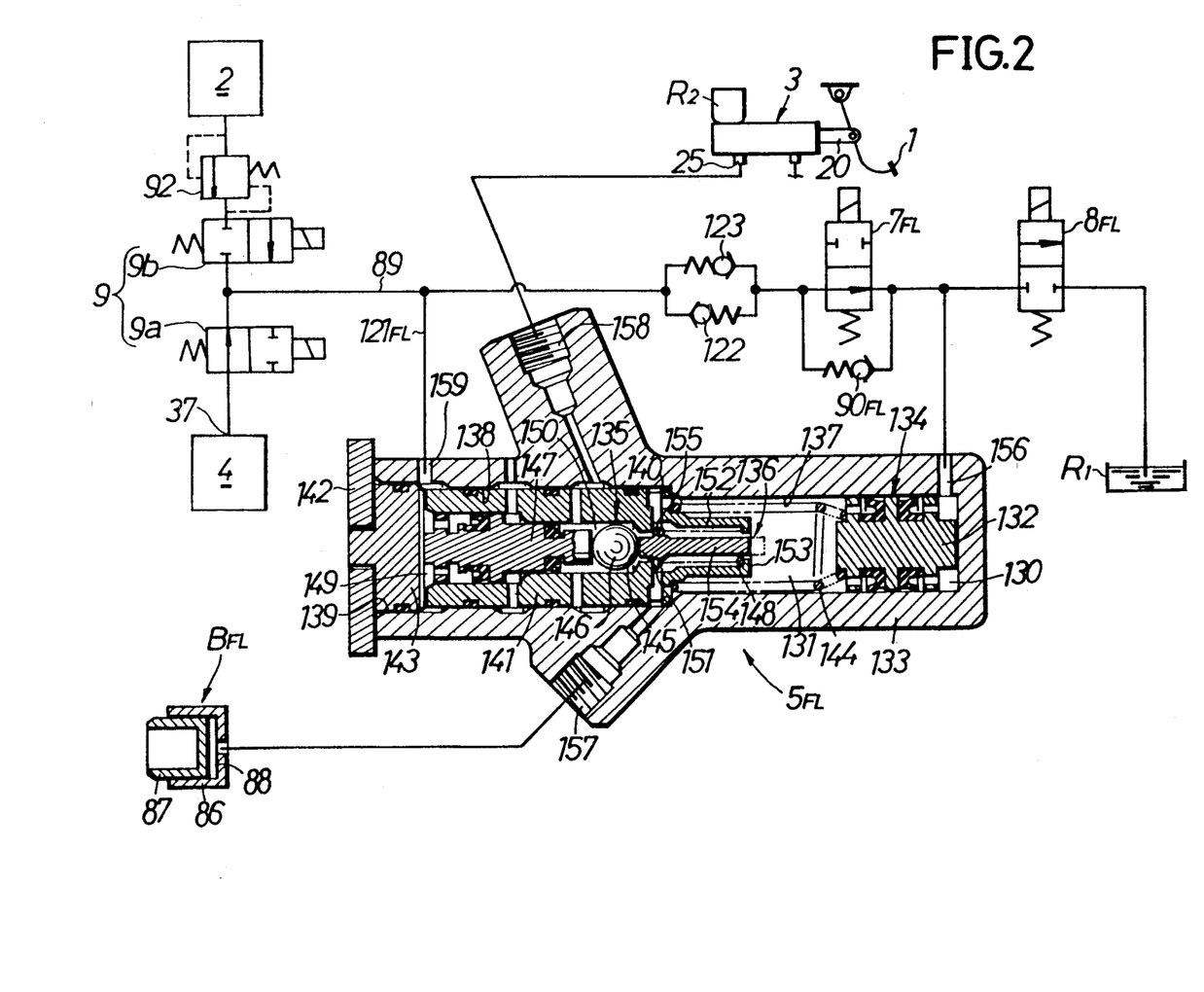
FIG. 2 is a sectional view illustrating the construction of a hydraulic pressure switchover device.

Referring to FIG. 2, the hydraulic pressure switchover devices $5_{FL}$, $5_{FR}$ and $5_R$ have basically the same structure and hence, only the structure of one of them, $5_{FL}$, will be described below in detail.

The hydraulic pressure switchover device $5_{FL}$ comprises a hydraulic pressure transmitting means 134 which is comprised of a free piston 132 slidably received in a cylinder body 133 and having opposite end faces facing respectively an input hydraulic pressure chamber 130 connected to the supply source hydraulic pressure control means 4 and an output hydraulic pressure chamber 131 leading to the hydraulic braking pressure chamber 88 in the left front wheel brake device $B_{FL}$, an on-off valve 135 interposed between the second hydraulic pressure chamber 19, i.e. the second output port 25 in the auxiliary hydraulic pressure generating means 3, and the hydraulic braking pressure chamber 88 in the brake device $B_{FL}$ and adapted to be closed in response to an increase in output hydraulic pressure from the supply source hydraulic pressure control means 4, and a valve-opening means 136 for forcedly opening the on-off valve 135 in response to a movement of the free piston 132 by a predetermined distance or more in a direction to reduce the volume of the output hydraulic pressure chamber 131.

The cylinder body 133 is formed basically into a bottomed cylinder-like configuration and has a first bottomed bore 137, a second bore 138 having a diameter larger than that of the first bore 137, and a third bore 139 having a diameter larger than that of the second bore 138, which bores are coaxially arranged therein in sequence from one end (from the right-hand end as viewed in FIG. 2). A valve housing 141 is fitted into the second bore 138 to abut against a step 140 formed between the first and second bores 137 and 138. A retaining member 142 is secured to the other end (the left-hand end as viewed in FIG. 2) of the cylinder body 133, and an occluding member 143 is fitted into the third bore 139, between the retaining member 142 and the valve housing 141, thereby ensuring that the valve housing 141 is fixed within the cylinder body 133.

The free piston 132 is slidably received in the first bore 137. The input hydraulic pressure chamber 130 is defined between the closed end of the first bore 137 and the free piston 132, and the output hydraulic pressure chamber 131 is defined between the valve housing 141 and the free piston 132. Further, a return spring 144 is mounted in a compressed manner Within the output hydraulic pressure chamber 131 between the free piston 132 and the valve housing 141, so that the free piston 132 is biased in a direction to reduce the volume of the input hydraulic pressure chamber 130.

The hydraulic pressure transmitting means 134 functions to transmit a hydraulic pressure from the supply source hydraulic pressure control means 4 to each of the brake devices $B_{FL}$, $B_{FR}$, $B_{RL}$ and $B_{RR}$ when the hydraulic pressure from the hydraulic pressure supply source 2 is normal, but to prevent a back flow of a working or hydraulic fluid from each of the brake devices $B_{FL}$, $B_{FR}$, $B_{RL}$ and $B_{RR}$ toward the hydraulic supply source 2 if the hydraulic pressure from the hydraulic pressure supply source 2 is abnormally reduced.

The on-off valve 135 comprises the valve housing 141 which is basically cylindrical in form, a valve bore 145 provided in the valve housing 141 to communicate with the output hydraulic pressure chamber 131 in the hydraulic pressure transmitting means 134, a valve sphere 146 capable of closing the valve bore 145, a drive piston 147 slidably received in the valve housing 141 and integrally connected to the valve sphere 146 by brazing or the like, and a return spring 148 for biasing the valve sphere 146 in a valve-opening direction.

The drive piston 147 is of a diameter smaller than that of the free piston 132 in the hydraulic pressure transmitting means 134 and is slidably received in the valve housing 142 to define a pilot chamber 149 between the drive piston 147 itself and the occluding member 143, and a valve chest 150 between the drive piston 147 itself and the valve housing 141. A cylindrical portion 152 is provided coaxially on the valve housing 141 to project into the output hydraulic pressure chamber 131 and has an inside diameter such as to form a step 151 between the cylindrical portion 152 itself and the valve bore 145. The cylindrical portion 152 is provided at its leading end with a receiving collar 153 projecting radially inwardly.

The valve sphere 146 is contained in the valve chest 150, and a rod 154, which is smoothly inserted through the valve bore 145 so as to be able to abut against the valve sphere 146, is axially movably inserted in the cylindrical portion 152. Restraining collars 155 capable of abutting against the step 151 are provided at a circumferentially spaced apart distance on an outer surface of the rod 154 at a location closer to the valve bore 145, and the return spring 148 is compressed between the restraining collars 155 and the receiving collar 153, to surround the rod 154. This ensures that the rod 154 is biased in a direction to project from the valve bore 145 into the valve chest 150 by the force of the return spring 148, but the movement of the rod 154 is restrained by abutment of the restraining collars 155 against the step 151. In the latter restrained state of the rod 154, the valve sphere 146 is moved by the rod 154 to a position in which the valve bore 145 is open.

The effect of the on-off valve 135 is that when the hydraulic pressure in the pilot chamber 149 is lower than a given value, the valve sphere 146 is driven by the rod 154 until it opens the valve bore 145, thereby opening the on-off valve 135. When the hydraulic pressure in the pilot chamber 149 is equal to or higher than the given value, the drive piston 147 is moved, so that the valve bore 145 is closed by the valve sphere 146 to close the on-off valve 135. In this closed state of the on-off valve 135, the rod 154 projects a given amount into the output hydraulic pressure chamber 131, as shown by a dashed line in FIG. 2.

The valve-opening means 136 is thus comprised of the free piston 132, which is a component of the hydraulic pressure transmitting means 134, and the rod 154 which is a component of the on-off valve 135. If the free piston 132 is moved by an amount equal to or more than a given amount in a direction to reduce the volume of the output hydraulic pressure chamber 131, due to an abnormal reduction in hydraulic pressure in the output hydraulic pressure chamber 131 in a condition in which the on-off valve 135 has been closed, the free piston 132 is brought into abutment against that end of the rod 154 which projects from the cylindrical portion 152. The urging force of the free piston 132 to urge the valve sphere 146, through the rod 154, in the valve-opening direction is larger than that which biases the valve sphere 146 in the valve-closing direction. That is, the drive piston 147 drives the valve sphere 146 in the valve-closing direction in accordance with the difference between a force in the valve-opening direction provided by the hydraulic pressure applied from the second output port 25 in the auxiliary hydraulic pressure generating means 3 to the valve chest 150 and a force in the valve-closing direction provided by the hydraulic pressure applied to the pilot chamber 149, but the pressure-receiving area of the free piston 132 facing the input hydraulic pressure chamber 130 is set at a value enough to drive the rod 154 in the valve-opening direction with a force exceeding the force applied by the drive piston 147 to the valve sphere 146 in the valve-closing direction. Therefore, the valve sphere 146 is moved in the valve-opening direction through the rod 154 in response to a movement of the free piston 132 by an amount equal to or more than a predetermined amount in the direction to reduce the volume of the output hydraulic pressure chamber 131, as a result of an abnormal reduction in hydraulic pressure in the output hydraulic pressure chamber 131.

The cylinder body 133 is provided with a first input port 156 leading to the input hydraulic pressure chamber 130, an output port 157 leading from the output hydraulic pressure chamber 131, a second input port 158 leading from the valve chest 150, and a pilot port 159 leading to the pilot chamber 149.

Referring now to both FIG. 1 and FIG. 2, the first input port 156 in each of the hydraulic pressure switchover devices $5_{FL}$, $5_{FR}$ and $5_R$ is connected to the output port 37 in the supply source hydraulic pressure control means 4 through the inlet solenoid valves $7_{FL}$, $7_{FR}$ and $7_R$, the output hydraulic pressure passage 89 and a normally-open type solenoid valve 9a of the traction-controlling switchover control valve means 9, and to the reservoir $R_1$ through the outlet solenoid valves $8_{FL}$, $8_{FR}$ and $8_R$. The output ports 157 in the hydraulic pressure switchover devices $5_{FL}$ and $5_{FR}$ are connected directly to the hydraulic braking pressure chambers 88 in the brake devices $B_{FL}$ and $B_{FR}$, respectively, but the output port 157 in the hydraulic pressure switchover device $5_R$ is connected through the proportional pressure-reducing valve 6 to the hydraulic braking pressure chambers 88 in the brake devices $B_{RL}$ and $B_{RR}$. The proportional pressure-reducing valve 6 is of conventional well-known structure and serves to proportionally reduce a hydraulic pressure equal to or more than a certain value delivered from the output hydraulic pressure chamber 130 in the hydraulic pressure switchover device $5_R$, to apply a reduced hydraulic pressure to the hydraulic braking pressure chambers 88 in the brake devices $B_{RL}$ and $B_{RR}$.

Each of the inlet solenoid valves $7_{FL}$, $7_{FR}$ and $7_R$ is a solenoid valve adapted to cut off communication by energization thereof, and each of the outlet solenoid valves $8_{FL}$, $8_{FR}$ and $8_R$ is a solenoid valve adapted to permit communication by energization thereof. Hydraulic pressure releasing one-way valves $90_{FL}$, $90_{FR}$ and $90_R$ are connected in parallel to the inlet solenoid valves $7_{FL}$, $7_{FR}$ and $7_R$ respectively and are adapted to permit only a flow of the working or hydraulic fluid from the input hydraulic pressure chamber 130 toward the output hydraulic pressure passage 89.

The energization and deenergization of the inlet solenoid valves $7_{FL}$, $7_{FR}$ and $7_R$ and the outlet solenoid valves $8_{FL}$, $8_{FR}$ and $8_R$ are controlled by a control means 91. The control means 91 controls the inlet and outlet solenoid valves in such a manner that they remain deenergized during normal braking, but during an anti-lock control they can be switched over between a pressure-reducing control condition in which all of the inlet and outlet solenoid valves are energized, a pressure-maintaining control condition in which the inlet solenoid valves $7_{FL}$, $7_{FR}$ and $F_R$ are energized and the outlet solenoid valves $8_{FL}$, $8_{FR}$ and $8_R$ are deenergized, and a pressure-increasing condition in which all of the inlet and outlet solenoid valves are deenergized.

The traction-controlling switchover control valve means 9 comprises a normally-open type solenoid valve 9a interposed between the output port 37 in the supply source hydraulic pressure control means 4 and the output hydraulic pressure passage 89, and a normally-closed type solenoid valve 9b interposed between the hydraulic pressure supply source 2 and the output hydraulic pressure passage 89. The energization and deenergization of the solenoid valves 9a and 9b are also controlled by the control means 91, so that in a normal condition the solenoid valve 9a is deenergized and open and the solenoid valve 9b is deenergized and closed, whilst during a traction control the solenoid valve 9a is energized and closed and the solenoid valve 9b is energized and open. Further, the control means 91 is capable of controlling the energization and deenergization of the solenoid valve 9a for switchover therebetween in the pressure-increasing condition during the anti-lock control, i.e. in a condition in which all of the inlet and outlet solenoid valves are deenergized.

The solenoid valve 9b in the traction-controlling switchover control valve means 9 is connected to the hydraulic pressure supply source 2 through a uniform differential pressure type pressure-reducing valve 92. Therefore, when the solenoid valve 9b is open, the pressure of the working or hydraulic fluid from the hydraulic pressure supply source 2 is reduced by the pressuring-reducing valve 92 and supplied to the output hydraulic pressure passage 89.

The first output port 25 in the auxiliary hydraulic pressure generating means 3 is connected to the second input port 158 in the hydraulic pressure switchover devices $5_{FL}$ and $5_{FR}$, so that the hydraulic pressure in the second hydraulic pressure chamber 19 in the auxiliary hydraulic pressure generating means 3 is applied to the hydraulic braking pressure chambers 88 in the brake devices $B_{FL}$ and $B_{FR}$ when the on-off valve 135 is open. A hydraulic pressure passage 106 is also connected between the second input port 158 in the hydraulic pressure switchover device $5_R$ and the first output port 24 in the auxiliary hydraulic pressure generating means 3, through a hydraulic pressure restricting means 93.

The hydraulic pressure restricting means 93 comprises a first one-way valve 95 which only permits flow of the hydraulic fluid from the first hydraulic pressure chamber 18 toward the hydraulic pressure passage 106, in response to the output hydraulic pressure in the first hydraulic pressure chamber 18 in the auxiliary hydraulic pressure generating means 3 exceeding a certain preset value, and a second one-way valve 96 connected in parallel to the first one-way valve 95 which only permits flow of the hydraulic fluid from the hydraulic pressure passage 106 toward the first hydraulic pressure chamber 18. In addition, the hydraulic pressure passage 106 is connected to the reservoir $R_2$ through a third one-way valve 97 which only permits flow of the hydraulic fluid from the reservoir $R_2$ toward the hydraulic pressure passage 106.

The first one-way valve 95 is adapted to open to permit flow of the hydraulic fluid from the hydraulic pressure passage 106 toward the first hydraulic pressure chamber 18 when the hydraulic pressure in the first hydraulic pressure chamber 19 exceeds the preset value. The preset value is set at a level equal to or more than that hydraulic pressure in the first input pressure application chamber 51 which is required to operate the supply source hydraulic pressure control means 4, until the on-off valve 135 in the hydraulic pressure switchover device $5_R$ can be closed by the output hydraulic pressure from the output port 37 in the control means 4.

The second one-way valve 96 opens in response to a reduction in hydraulic pressure in the first hydraulic pressure chamber 18 to a level smaller than the hydraulic pressure in the hydraulic pressure passage 106, thereby permitting the hydraulic fluid in the hydraulic pressure passage 106 to be released toward the chamber 18.

The third one-way valve 97 is adapted to open to permit flow of the hydraulic fluid in the reservoir $R_2$ toward the hydraulic pressure passage 106 in response to a reduction in hydraulic pressure in the hydraulic pressure passage 106 to a level smaller than the hydraulic pressure in the reservoir $R_2$.

Thus, during braking, the hydraulic pressure in the first hydraulic pressure chamber 18 can be reduced by a predetermined value under the operation of the first one-way valve 95 and applied to the rear wheel brake devices $B_{RL}$ and $B_{RR}$ via the valve chest 150 in the hydraulic pressure switchover device $5_R$, and the hydraulic pressure in the rear wheel brake devices $B_{RL}$ and $B_{RR}$ can be released to the first hydraulic pressure chamber 18 through the second one-way valve 96 in response to a reduction in hydraulic pressure in the first hydraulic pressure chamber 18 as a result of completion of the braking operation. In addition, breathing between the hydraulic braking pressure chambers 88 in the rear wheel brake devices $B_{RL}$ and $B_{RR}$ and the first one-way valve 95, due to a variation in temperature or the advancing movement of the braking piston 87 because of wear on a brake pad, can be effected through the second one-way valve 96 during increase of the pressure and through the third one-way valve 97 during reduction of the pressure.

Hydraulic pressure branch passages $121_{FL}$, $121_{FR}$ and $121_R$ diverging from the output hydraulic pressure passage 89 are connected to the pilot ports 159 in the hydraulic pressure switchover devices $5_{FL}$, $5_{FR}$ and $5_R$. Thus, in a condition in which the hydraulic pressure in the hydraulic pressure branch passages $121_{FL}$, $121_{FR}$ and $121_R$, i.e. in the pilot chamber 149, is high, the on-off valve 35 is closed, and when the hydraulic pressure in the hydraulic pressure branch passages $121_{FL}$, $121_{FR}$ and $121_R$ is reduced, the on-off valve 135 is opened.

A fourth one-way valve 122 is provided in the output hydraulic pressure passage 89 at a location spaced from the diverging points toward the hydraulic pressure switchover devices $5_{FL}$, $5_{FR}$ and $5_R$. The valve 122 is adapted to open in response to a differential pressure equal to or more than a preset value so as to permit flow of the hydraulic fluid only from the output port 37 toward the first input ports 156 in the hydraulic pressure switchover devices $5_{FL}$, $5_{FR}$ and $5_R$.

A fifth one-way valve 123 is connected in parallel to the fourth one-way valve 122. The valve 123 is adapted to open in response to a differential pressure equal to or more than a preset value, to permit flow of the hydraulic fluid from the first input ports 156 in the hydraulic pressure switchover devices $5_{FL}$, $5_{FR}$ and $5_R$ toward the output ports 37. The preset pressure for opening the valve 123 is set to be smaller than the preset pressure for opening the fourth one-way valve 122.

The first output port 24 in the auxiliary hydraulic pressure generating means 3 is connected to the first input pressure application chamber 51 in the supply source hydraulic pressure control means 4, while the second output port 25 is connected to the second input pressure application chamber 52 in the control means 4. Thus the hydraulic pressure in the second hydraulic pressure chamber 19, as it is, is supplied to the second input pressure application chamber 52, whereas a hydraulic pressure reduced in the first hydraulic pressure chamber 18 is supplied to the first input pressure application chamber 51. If the pressure-receiving area $S_3$ of the second urging piston 34 facing the second input pressure application chamber 52 were to be set at a value equal to or more than the pressure-receiving area $S_1$ of the first urging piston 33 facing the first input pressure application chamber 51, this would result in a smaller pressure-reducing effect provided by the proportional pressure-reducing valve 54. Therefore, the pressure-receiving area $S_3$ of the second urging piston 34 is set to be smaller than the pressure-receiving area $S_1$ of the first urging piston 33, to such an extent that the pressure-reducing effect of the proportional pressure-reducing valve 54 is not lost.

The operation of this embodiment will now be described. First, suppose that a normal braking operation is effected in a condition in which the hydraulic pressure supply source 2 is normally operative. In this case, the inlet solenoid valves $7_{FL}$, $7_{FR}$ and $7_R$ and the outlet solenoids valves $8_{FL}$, $8_{FR}$ and $8_R$ are in their deenergized states (as shown in FIGS. 1 and 2), and the solenoid valves $9a$ and $9b$ in the traction-controlling switchover control means 9 are also in their deenergized states (again as shown in FIGS. 1 and 2). Further, the shut-off valve 55 is open as a result of application of the hydraulic pressure from the hydraulic pressure supply source 2 to the back pressure chamber 78. Thus, the output port 37 in the supply source hydraulic pressure control means 4 is in communication with the output hydraulic pressure passage 89 which is in communication with the input hydraulic pressure chambers 130 in the hydraulic pressure switchover devices $5_{FL}$, $5_{FR}$ and $5_R$ through the solenoid valves $7_{FL}$, $7_{FR}$ and $7_R$. In addition, the first output port 24 in the auxiliary hydraulic pressure generating means 3 is in communication with the first input hydraulic pressure application chamber 51 in the supply source hydraulic pressure control means 4 and with the accumulator 56 through the proportional pressure-reducing valve 54, and the second output port 25 is in communication with the second input hydraulic pressure application chamber 52.

If the brake pedal 1 is depressed in such condition, the first working piston 16 in the auxiliary hydraulic pressure generating means 3 is advanced, so that the hydraulic pressure developed in the first hydraulic pressure chamber 18 is reduced by the proportional pressure-reducing valve 54 and applied to the first input hydraulic pressure application chamber 51 in the supply source hydraulic pressure control means 4 and to the accumulator chamber 58 in the accumulator 56. At this time, the supply source hydraulic pressure control means 4 starts its operation earlier than the accumulator 56. More specifically, that pressure-receiving area $S_1$ of the first urging piston 33 in the control means 4 which faces the input hydraulic pressure chamber 51, the pressure-receiving area $S_2$ of the accumulator piston 59 facing the accumulator chamber 58, the preset load $f_1$ of the spring 42 in the control means 4, and the preset load $f_2$ of the first accumulator spring 60 in the accumulator 56, are set in such a manner that the above-mentioned expression (1) is established.

This ensures that, in the supply source hydraulic pressure control means 4, the first urging piston 33 is advanced to cause the spool 31 having its near end placed in abutment against the first urging piston 33, to be advanced, before the accumulator 56 is operated for accumulation. In this way, it is possible to avoid the generation of a wasteful reaction force and to prevent a loss in depression force on the brake pedal 1, i.e. to provide an improved responsiveness, by starting the operation of the supply source hydraulic pressure control means 4 prior to the operation of the accumulator 56 for accumulation.

In the supply source hydraulic pressure control means 4, at a point in time when the spool 31 has been advanced by a certain distance in accordance with the advancing movement of the first urging piston 33, the output port 37 is put into communication with the input port 38, so that the output hydraulic pressure from the output port 37 in communication with the hydraulic pressure source 2 is rapidly increased. Then, the on-off valves 135 in the hydraulic pressure switchover devices $5_{FL}$, $5_{FR}$ and $5_R$ are first closed in response to an increase in hydraulic pressure in the hydraulic pressure branch passages $121_{FL}$, $121_{FR}$ and $121_R$ before the differential pressure across the fourth one-way valve 122 in the output hydraulic pressure passage 89 reaches the valve-opening preset pressure The fourth one-way valve 122 is then opened in response to such differential pressure becoming equal to or more than the valve-opening preset pressure This causes the hydraulic pressure from the output port 37 to be applied to the input hydraulic pressure chambers 130 in the hydraulic pressure switchover devices $5_{FL}$, $5_{FR}$ and $5_R$ through the output hydraulic pressure passage 89 and the inlet solenoid valves $7_{FL}$, $7_{FR}$ and $7_R$ to provide a hydraulic braking pressure in the brake devices $B_{FL}$ and $B_{FR}$, while causing the hydraulic pressure delivered from the output hydraulic pressure chamber 131 in the hydraulic pressure switchover device $5_R$ to be reduced in the proportional pressure-reducing valve 6 and applied to the rear wheel brake devices $B_{RL}$ and $B_{RR}$. Therefore, during braking, it is possible to positively close the on-off valve 135 prior to the operation of the hydraulic pressure transmitting means 134 in each of the hydraulic pressure switchover devices $5_{FL}$, $5_{FR}$ and $5_R$ and to increase the hydraulic braking pressure simultaneously with the operation of each of the hydraulic pressure transmitting means 134 to provide improved responsiveness.

The rapid increase in output hydraulic pressure from the output port 37 causes the supply of a relatively high hydraulic pressure to eliminate a backlash in a portion to each of the brake devices $B_{FL}$, $B_{FR}$, $B_{RL}$ and $B_{RR}$ and to provide a smooth initial operation of the braking piston 87 of each of the brake devices $B_{FL}$, $b_{FR}$, $B_{RL}$ and $B_{RR}$.

At the instant when the on-off valves 135 in the hydraulic pressure switchover devices $5_{FL}$, $5_{FR}$ and $5_R$ are closed by the hydraulic pressure from the output port 37, the first one-way valve 95 in the hydraulic pressure restricting means 93 is opened, causing the hydraulic pressure from the first hydraulic pressure chamber 18 in the auxiliary pressure generating means 3 to be applied to the valve chest 150 in the on-off valve 135 in the hydraulic pressure switchover device $5_R$, while the advancing movement of the second working piston 17 in the auxiliary hydraulic pressure generating means 3 is started, causing the hydraulic pressure generated in the second hydraulic pressure chamber 19 to be applied to the valve chest 150 in the on-off valves 135 in the hydraulic pressure switchover devices $5_{FL}$ and $5_{FR}$. Because each of the on-off valves 135 is closed, however, the hydraulic pressure in the first and second hydraulic pressure chambers 18 and 19 cannot be applied to the brake devices $B_{FL}$, $B_{FR}$, $B_{RL}$ and $B_{RR}$.

The communication of the output port 37 with the input port 38 permits the hydraulic pressure in the output hydraulic pressure application chamber 45 also to be increased, causing the reaction piston 32 to be driven rearwardly to abut against the front end of the spool 31, thereby retreating the spool 31 to put the output port 37 out of communication with the input port 38. If the brake pedal 1 is further depressed, the hydraulic pressure in the first hydraulic pressure chamber 18 is increased, and in response to such increase the spool 31 is advanced again to put the output port 37 into communication with the input port 38. In this manner, the spool 31 can be reciprocally moved in response to the braking operation of the brake pedal 1 between its forward position in which the output port 37 is in communication with the input port 38 and its rearward position in which the output port 37 is out of communication with the input port 38, thereby permitting the hydraulic pressure from the hydraulic pressure supply source 2 to be controlled in accordance with the amount of brake pedal depression and delivered from the output port 37.

In this manner, the hydraulic pressure from the hydraulic pressure supply source 2 can be controlled in accordance with the amount of braking operation and applied to each of the brake devices $B_{FL}$, $B_{FR}$, $B_{RL}$ and $B_{RR}$, but each of the brake devices and the hydraulic circuit from the input hydraulic pressure chamber 130 to the hydraulic pressure supply source 2 are isolated by the free piston 132 in the hydraulic pressure transmitting means 134 of each of the hydraulic pressure switchover devices $5_{FL}$ and $5_{FR}$, and hence any gas which may possibly be present in the hydraulic fluid cannot exert an adverse influence on the brake devices.

During such braking, the braking force for the rear wheels is required to be lower than that for the front wheels and can be reduced in a given proportion to that for the front wheels by reducing the hydraulic pressure from the supply source hydraulic pressure control means 4 by means of the proportional pressure-reducing valve 54.

In addition, the hydraulic pressure in the first hydraulic pressure chamber 18 is applied to the first input pressure application chamber 51 through the proportional pressure-reducing valve 54 and therefore, in a high pressure region after sufficient exhibition of the hydraulic braking pressure, it is possible to control the hydraulic pressure applied to the first input pressure application chamber 51 and the accumulator 56 to a low level to contribute to a reduction in loading of the supply source hydraulic pressure control means 4 and the accumulator 56. Moreover, if the brake pedal 1 is depressed several times when the vehicle is stopped, the frequency of increases in hydraulic pressure downstream of the supply source hydraulic pressure control means 4 can be suppressed to a small level by reducing the hydraulic pressure in the first hydraulic pressure chamber 18 and applying the reduced hydraulic pressure to the first input pressure application chamber 51, thereby reducing the amount of hydraulic fluid circulated so as to suppress the wasteful consumption of the hydraulic fluid, while suppressing the frequency of operation of the free piston 83 in the hydraulic pressure transmitting means 134 of each of the hydraulic pressure switchover devices $5_{FL}$, $5_{FR}$ and $5_R$ to contribute to an improvement in durability.

Further, a desired pedal stroke of the brake pedal 1 can be ensured by accumulating the hydraulic pressure from the first hydraulic pressure chamber 18 in the accumulator 56, thereby eliminating the need for a construction for ensuring the pedal stroke in the supply source hydraulic pressure control means 4, and thus leading to a reduction in size of the control means 4. Moreover, it is possible to avoid a rapid application of a reaction force directly to the brake pedal 1 due to a damper effect by the accumulator 56 upon application of a rapid reaction force.

If the depression force applied to the brake pedal 1 is too large during such braking, with the result that a wheel is about to become locked, the inlet solenoid valve $7_{FL}$, $7_{FR}$ or $7_R$ corresponding to the wheel about to become locked is energized to cut off the communication between the output hydraulic pressure passage 89 and the input hydraulic pressure chamber 130 in the corresponding one of the hydraulic pressure switchover devices $5_{FL}$, $5_{FR}$ and $5_R$. This suppresses an increase in hydraulic braking pressure to prevent the wheel becoming locked. If the wheel is still about to become locked, then the tendency to locking of the wheel can be avoided by energization of the corresponding one of the outlet solenoid valves $8_{FL}$, $8_{FR}$ and $8_R$ to put the input hydraulic pressure chamber 130 into communication with the reservoir $R_1$ and thus reduce the hydraulic braking pressure.

After elimination of such locking tendency the inlet solenoid valve $7_{FL}$, $7_{FR}$ or $7_R$ is deenergized, and at the same time the outlet solenoid valve $8_{FL}$, $8_{FR}$ or $8_R$ is deenergized. This ensures that the hydraulic pressure from the output port 37 in the supply source hydraulic pressure control means 4 can be applied again to the input hydraulic pressure chamber 130 in the hydraulic pressure transmitting means 134 in the hydraulic pressure switchover device $5_{FL}$, $5_{FR}$ or $5_R$, to provide an increased hydraulic braking pressure.

During an increase in pressure in such an anti-lock control condition, a more precise anti-lock control for both of the front wheels can be carried out by intermittently controlling the operation of the solenoid valve $9a$ in the traction-controlling switchover valve means 9. That is, the intermittent closing of the solenoid valve $9a$ makes it possible to avoid that the hydraulic pressure from the output port 37 is rapidly applied to each of the inlet solenoid valves $7_{FL}$, $7_{FR}$ and $7_R$, thereby providing a moderate increase in hydraulic pressure. In addition, in a state where the left and right front wheels are in contact with road surfaces of different friction coefficients and an anti-lock control is being conducted for whichever one of the wheels is in contact with the surface of lower friction coefficient, it is also possible to suppress an increase in hydraulic braking pressure for the front wheel in contact with the road surface of higher friction coefficient by intermittently closing the solenoid valve $9a$, thereby to moderately suppress the generation of a yaw moment of a vehicle body.

Suppose now that a high hydraulic pressure is not obtained from the hydraulic pressure supply source 2, due to trouble with the hydraulic pump 11 or the like, during the above-described braking. In this case, the on-off valve 135 in each of the hydraulic pressure switchover devices $5_{FL}$, $5_{FR}$ and $5_R$ is opened due to a reduction in hydraulic pressure in each of the hydraulic pressure branch passages $121_{FL}$, $121_{FR}$ and $121_R$ corresponding to a reduction in hydraulic pressure from the output port 37 in the supply source hydraulic pressure control means 4. Thus, the hydraulic braking pressures generated in the first and second hydraulic pressure chambers 18 and 19 in the auxiliary hydraulic pressure generating means 3 are applied directly to the brake devices $B_{FL}$, $B_{FR}$, $B_{RL}$ and $B_{RR}$, respectively, thereby ensuring a hydraulic braking pressure.

In this case, the hydraulic braking pressure of each of the brake devices $B_{FL}$, $B_{FR}$, $B_{RL}$ and $B_{RR}$ cannot be released toward the supply source hydraulic pressure control means 4, because the hydraulic pressure transmitting means 134 of the hydraulic pressure switchover devices $5_{FL}$, $5_{FR}$ and $5_R$ are interposed between the brake devices $B_{FL}$, $B_{FR}$, $B_{RL}$ and $B_{RR}$ and the supply source hydraulic pressure control means 4.

Moreover, in response to an abnormal reduction in hydraulic pressure in the hydraulic pressure supply source 2, the shut-off valve 55 is closed by a reduction in hydraulic pressure in the back pressure chamber 78, thereby cutting off the communication between the hydraulic pressure passage 53 and the accumulator 56. Thus it is avoided that an unrequired reaction force by the accumulator 56 is applied to the brake pedal 1.

During non-braking, after completion of a braking operation, the on-off valve 135 in each of the hydraulic pressure switchover devices $5_{FL}$, $5_{FR}$ and $5_R$ is first opened due to a reduction in hydraulic pressure in the hydraulic pressure branch passages $121_{FL}$, $121_{FR}$ and $121_R$ corresponding to a reduction in output hydraulic pressure from the output port 37. Then, the first one-way valve 123 is opened in response to the differential pressure across the fifth one-way valve 123 becoming equal to or more than the preset valve-opening pressure, thereby permitting the input hydraulic pressure chamber 130 in each of the hydraulic pressure transmitting means 134 to be put into communication with the reservoir R through the supply source hydraulic pressure control means 4. Thus, breathing of the output hydraulic pressure chamber 131 is made possible in response to the movement of the free piston 132 in the hydraulic pressure transmitting means 134 toward the input hydraulic pressure chamber 130. Moreover, the hydraulic pressure in the input hydraulic pressure chamber 130 in each of the hydraulic pressure transmitting means 134 can be released to the output hydraulic pressure passage 89 via each of the hydraulic pressure releasing one-way valves $90_{FL}$, $90_{FR}$ and $90_R$ and therefore, even if the resistance to flow in the inlet solenoid valves $7_{FL}$, $7_{FR}$ and $7_R$ is large, the hydraulic pressure in the input hydraulic pressure chamber 130 can be released promptly to return the free piston 132 quickly to its original position.

There also may be a case wherein the hydraulic pressure in the input hydraulic pressure chamber 130 is increased due to an increase in temperature in the hydraulic pressure transmitting means 134 in each of the hydraulic pressure switchover devices $5_{FL}$, $5_{FR}$ and $5_R$ when braking is not occurring. In this case, a hydraulic braking pressure will be applied if the hydraulic pressure cannot be released. However, the fifth one-way valve 123 can open in response to an increase in hydraulic pressure in the input hydraulic pressure chamber 130 to release the hydraulic fluid in an amount corresponding to an increase in hydraulic pressure, because the preset valve-opening pressure for the fifth one-way valve 123 is set at a relatively small value smaller than that for the fourth one-way valve 122.

If the driving force of the engine is too large, with the result that the driving wheels are about to become locked, the solenoid valves 9a and 9b of the traction-controlling switchover control valve means 9 are energized by the control means 91. This causes the hydraulic pressure from the hydraulic pressure supply source 2 to be applied to the input hydraulic pressure chambers 130 in the hydraulic pressure switchover devices $5_{FL}$ and $5_{FR}$, so that a hydraulic braking pressure is produced in the brake devices $B_{FL}$, $B_{FR}$ for the left and right front wheels, which are the driving wheels, thereby ensuring that the generation of excessive slipping is avoided. Thereafter, it is possible to control the hydraulic braking pressure by controlling the energization and deenergization of the inlet solenoid valves $7_{FL}$ and $7_{FR}$ and the outlet solenoid valves $8_{FL}$ and $8_{FR}$, as during the above-described anti-lock control.

Moreover, the output hydraulic pressure from the hydraulic pressure supply source 2 is set to be rather large, but this hydraulic pressure is reduced down to a level suitable for the control by the pressure-reducing valve 92, and hence the traction control cannot be conducted due to too large a hydraulic pressure. Therefore, the responsiveness of the control cannot be reduced and made less smooth.

In such hydraulic braking pressure control system, a hydraulic pressure generated in the first hydraulic pressure chamber 18 in the auxiliary hydraulic pressure generating means 3 is reduced in the proportional pressure-reducing valve 54 and supplied to the first input pressure application chamber 51 in the supply source hydraulic pressure control means 4, and if the hydraulic pressure supply source 2 then fails, such hydraulic pressure is applied to the brake devices $B_{RL}$ and $B_{RR}$ via the on-off valve 135 of the hydraulic pressure switchover device $5_R$ and the proportional pressure-reducing valve 6. A hydraulic pressure generated in the second hydraulic pressure chamber 19 is applied to the second input pressure application chamber 52 in the supply source hydraulic pressure control means 4, and if the hydraulic pressure supply source 2 fails, such hydraulic pressure is applied to the brake devices $B_{FL}$ and $B_{FR}$ via the on-off valves 135 of the hydraulic pressure switchover devices $5_{FL}$ and $5_{FR}$. Therefore, each of the first and second hydraulic pressure chambers 18 and 19 in the auxiliary hydraulic pressure generating means 3 has two functions, leading to a reduction in size of the auxiliary hydraulic pressure generating means 3.

The first and second input pressure application chambers 51 and 52 for exhibiting a hydraulic pressure force for driving the spool 31 are provided in the supply source hydraulic pressure control means 4, and even if a hydraulic pressure is applied to either of the chambers 51 and 52, the spool 31 can be driven. Therefore, even if a defect in hydraulic pressure is produced either between the first hydraulic pressure chamber 18 in the auxiliary hydraulic pressure generating means 3 and the first input pressure application chamber 51 or between the second hydraulic pressure chamber 19 and the second input pressure application chamber 52, the supply source hydraulic pressure control means 4 can be driven to supply a hydraulic braking pressure to each of the brake devices $B_{FL}$, $B_{FR}$, $B_{RL}$ and $B_{RR}$.

Suppose that an abnormality is produced in the hydraulic circuit between each of the hydraulic pressure switchover devices $5_{FL}$, $5_{FR}$ and $5_R$ and each of the brake devices $B_{FL}$, $B_{FR}$, $B_{RL}$ and $B_{RR}$ in a condition in which the on-off valve 135 in each of the hydraulic pressure devices $5_{FL}$, $5_{FR}$ and $5_R$ is in its closed state and a hydraulic braking pressure corresponding to the output hydraulic pressure from the supply source hydraulic pressure control means 4 is provided in each of the brake devices $B_{FL}$, $B_{FR}$, $B_{RL}$ and $B_{RR}$. That is, if an uneven wear of the pad is produced in each of the brake devices $B_{FL}$, $B_{FR}$, $B_{RL}$ and $B_{RR}$, or if a vapor lock is produced in the hydraulic circuit between the hydraulic pressure transmitting means 134 and each of the brake devices $B_{FL}$, $B_{FR}$, $B_{RL}$ and $B_{RR}$, then the amount of fluid consumed is abnormally increased, so that a satisfactory hydraulic braking pressure may be not obtained in some cases, even if the output hydraulic pressure from the hydraulic pressure supply source 2 is normal. However, if the free piston 132 in the hydraulic pressure transmitting means 134 of each of the hydraulic pressure switchover devices $5_{FL}$, $5_{FR}$ and $5_R$ is moved by a predetermined amount or more in a direction to reduce the volume of the output hydraulic pressure chamber 131 in response to an abnormal increase in amount of fluid consumed, the free piston 132 is brought into abutment against the rod 154 to urge it, thereby opening the on-off valve 135. Therefore, a hydraulic pressure delivered from the auxiliary hydraulic pressure generating means 3 can be applied to the brake devices $B_{FL}$, $B_{FR}$, $B_{RL}$ and $B_{RR}$ in such a manner as to compensate for such a deficiency, thereby ensuring that a satisfactory hydraulic braking pressure can be secured.

If a leak of the fluid is produced in a hydraulic circuit between each of the hydraulic pressure switchover devices $5_{FL}$, $5_{FR}$ and $5_R$ and each of the brake devices $B_{FL}$, $B_{FR}$, $B_{RL}$ and $B_{RR}$, then the valve-opening means 136 is likewise operated in response to an abnormal increase in amount of fluid consumed, thereby opening the on-off valve 135 to permit the output hydraulic pressure from the auxiliary hydraulic pressure generating means 3 to be applied to each of the brake devices $B_{FL}$, $B_{FR}$, $B_{RL}$ and $B_{RR}$. Because of the leak of the fluid produced, the advancing stroke of the working piston 16, 17 in the auxiliary hydraulic pressure generating means 3, i.e. the amount of brake pedal depression, is abnormally increased as compared with a normal condition. This enables an operator to promptly recognize the fact that a leak of the fluid has been produced in the hydraulic circuit between the hydraulic pressure switchover device $5_{FL}$, $5_{FR}$ and $5_R$ and the brake device $B_{FL}$, $B_{FR}$, $B_{RL}$ and $B_{RR}$.

While the invention has been particularly shown and described in reference to preferred embodiments thereof, it will be understood by those skilled in the art that changes in form and details may be made therein without departing from the spirit and scope of the invention.

What is claimed is:

1. A hydraulic braking pressure control system comprising:
   a brake device ($B_{FL}$, $B_{FR}$, $B_{RL}$, $B_{RR}$);
   a hydraulic pressure control means (4) for controlling a hydraulic pressure from a hydraulic pressure supply source (2) in accordance with an amount of operation of an operating member (1).
   an auxillary hydraulic pressure generating means (3) including a working piston (16, 17) operatively connected to said operating member to advance in response to operation of said operating member and being slidably received in a housing (14) with a front surface of the working piston facing a hydraulic pressure chamber (18, 19) which is defined in said auxiliary hydraulic pressure generating means (3);
   a hydraulic pressure transmitting means (134) including a free piston (132) slidably received in a cylinder body (133) and having opposite ends facing an input hydraulic pressure chamber (130) connected to said hydraulic pressure control means (4) and an output hydraulic pressure chamber (131) leading to said brake device, respectively; and
   an on-off valve (135) interposed between the hydraulic pressure chamber (18, 19) in said auxillary hydraulic pressure generating means (3) and said brake device and adapted to be closed by a drive means (147) in response to an increase in a hydraulic pressure output from said hydraulic pressure control means,
   wherein said system further includes valve-opening means (136) for forcedly opening said on-off valve in response to the movement of said free piston by at least a predetermined distance in a direction to reduce the volume of said output hydraulic pressure chamber.

2. A system as claimed in claim 1, wherein said on-off valve (135) and said valve-opening means (136) are housed in said cylinder body (133) of the hydraulic pressure transmitting means (134).

3. A system as claimed in claim 2, wherein said valve-opening means (136) is located on an opposite side of said output hydraulic pressure chamber (131) from said free piston (132).

4. A system as claimed in claim 3, wherein said valve-opening means (136) includes a valve-opening rod (154) mounted for sliding movement to open said on-off valve (135) and protruding into said output hydraulic pressure chamber (131) so as to be engageable by said free piston (132), and thereby movable in a valve-opening direction, upon movement of said free piston.

5. A system as claimed in claim 4, wherein said on-off valve (135) comprises a valve sphere (146) which cooperates with a valve bore (145) to close the valve, said valve-opening rod (154) being mounted for movement through said valve bore to displace the sphere to open the valve.

6. A hydraulic braking pressure control system comprising:
   a brake device ($B_{FL}$, $B_{FR}$, $B_{RL}$, $B_{RR}$);
   a hydraulic pressure control means (4) for controlling a hydraulic pressure from a hydraulic pressure supply source (2) in accordance with an amount of operation of an operating member (1);
   an auxiliary hydraulic pressure generating means (3) including a working piston (16, 17) operatively connected to said operating member to advance in response to operation of said operating member and being slidably received in a housing (14) with a front surface of the working piston facing a hydraulic pressure chamber (18, 19) which is defined in said auxiliary hydraulic pressure generating means (3);
   a hydraulic pressure transmitting means (134) including a free piston (132) slidably received in a cylinder body (133) and having opposite ends facing an input hydraulic pressure chamber (130) connected to said hydraulic pressure control means (4) and an output hydraulic pressure chamber (131) leading to said brake device, respectively;
   an on-off valve (135) interposed between the hydraulic pressure chamber (18, 19) in said auxillary hydraulic pressure generating means (3) and said brake device and adapted to be closed by a drive means (147) in response to an increase in a hydraulic pressure output from said hydraulic pressure control means; and
   spring means (144) for biasing the free piston (132) in a direction to increase the volume of the output hydraulic pressure chamber (131);
   wherein said system further includes valve-opening means (136) for forcedly opening said on-off valve in response to the movement of said free piston by at least a predetermined distance in a direction to reduce the volume of said output hydraulic pressure chamber.

7. A hydraulic braking pressure control system comprising:
   means for braking ($B_{FL}$, $B_{FR}$, $B_{RL}$, $B_{RR}$);
   a primary pressure supply source (2);
   an auxiliary pressure supply source (3) which is operable to generate a hydraulic pressure in response to an operation of an operating member (1);
   means (4) for controlling a hydraulic pressure from said primary pressure supply source (2) in response to the operation of said operating member (1) and outputting the controlled hydraulic pressure;
   means ($5_{FL}$, $5_{FR}$, $5_R$) for feeding a hydraulic pressure to said braking means ($B_{FL}$, $B_{FR}$, $B_{RL}$, $B_{RR}$) for operation thereof dependent upon at least one of the hydraulic pressures from said controlling means (4) and said auxiliary pressure supply source (3), said feeding means ($5_{FL}$, $5_{FR}$, $5_R$) including an input hydraulic pressure chamber (130) for receiving the hydraulic pressure output from said controlling means (4), an output hydraulic pressure chamber (131) leading to the braking means, a free piston (132) separating the input and output hydraulic pressure chambers, and an on-off valve (135) which is held in a closed state with the hydraulic pressure from the controlling means (4) and permits upon opening thereof the hydraulic pressure from said auxiliary pressure supply source (3) to be fed to the braking means via said output hydraulic pressure chamber (131); and means (154) disposed in said output hydraulic pressure chamber (131) and operable in response to a reduction in volume more than a preset value of the output hydraulic pressure chamber (131) to thereby forcedly open the on-off valve.

8. A system as claimed in claim 7, wherein a spring means (144) is disposed in said output hydraulic pressure chamber (131) to bias the free piston (132) in a direction to increase the volume of the output hydraulic pressure chamber (131).

9. A system as claimed in claim 7, wherein said on-off valve (135) has a piston member (147) which receives at one of opposite ends thereof said hydraulic pressure from the auxiliary pressure supply source (3) and at the other of the opposite ends the hydraulic pressure from the controlling means (4) and with the hydraulic pressures on both of the opposite ends the piston member (147) holds the on-off valve (135) in its closed position, said other end of the piston member (147) being located near the output hydraulic pressure chamber (131).

* * * * *